May 4, 1943.　　　　F. M. SMITH　　　　2,318,262
APPARATUS FOR MACHINING SERRATIONS IN METALLIC BODIES
Filed Nov. 12, 1941
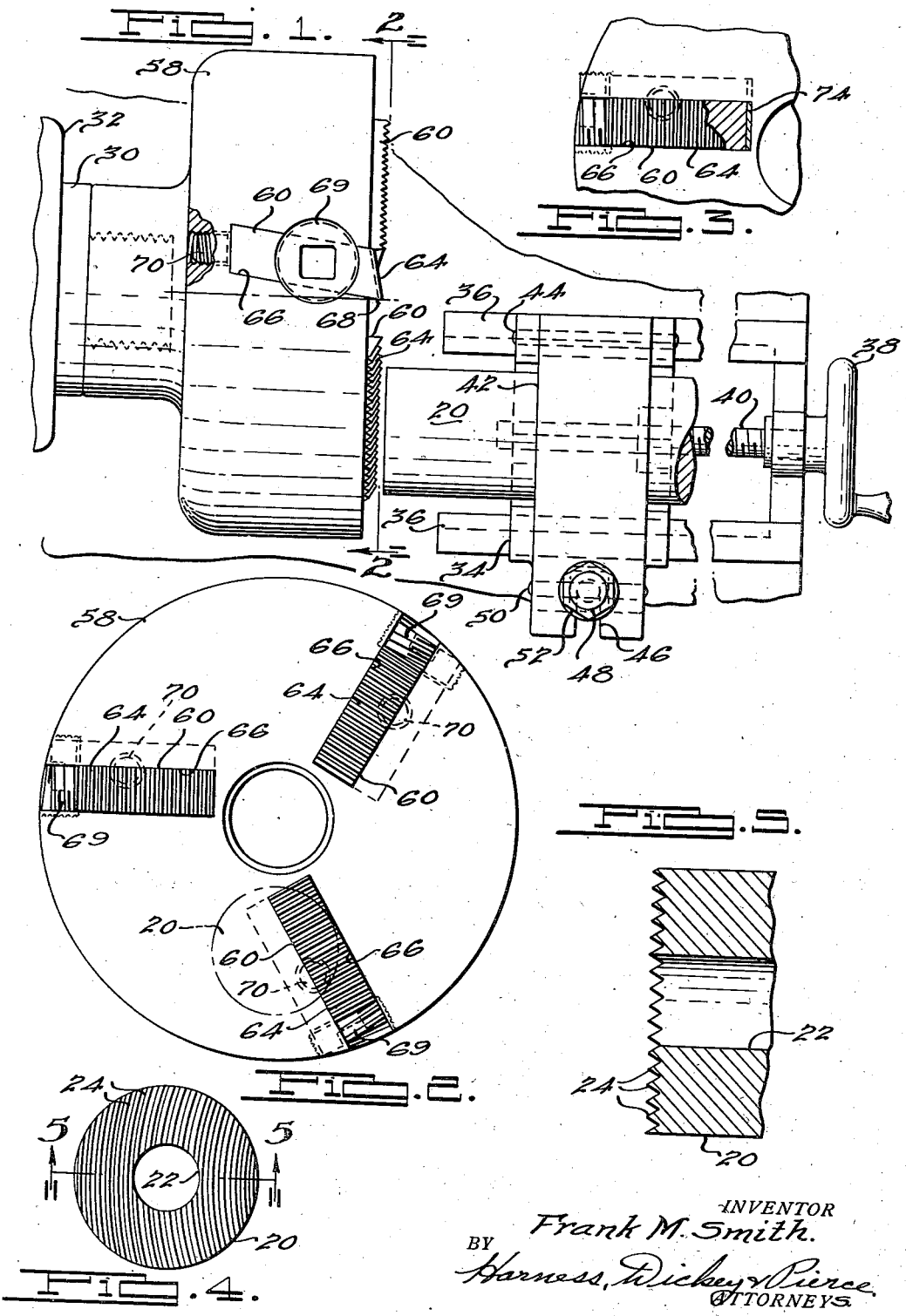
INVENTOR
Frank M. Smith.
BY Harness, Dickey & Pierce
ATTORNEYS Patented May 4, 1943

2,318,262

UNITED STATES PATENT OFFICE 2,318,262

APPARATUS FOR MACHINING SERRATIONS IN METALLIC BODIES

Frank M. Smith, Dearborn, Mich., assignor to Century Motors Corporation, Dearborn, Mich., a corporation of Michigan Application November 12, 1941, Serial No. 418,693

4 Claims. (Cl. 29—105)

This invention relates to apparatus for forming serrations in metallic bodies and has for its principal object the provision of apparatus of this type that is simple in construction, efficient in operation and economical to manufacture.

Objects of the invention include the provision of a cutting tool including a rotatable head supporting one or more generally radially disposed cutter blades having serrated cutting edges disposed on an axial face of the head; the provision of a tool of the type described in which each cutter blade is disposed with its cutting edge radial with respect the axis of rotation of the head; the provision in a tool of the type described of means for supporting the cutter blades in angular relation with respect to the axial end face of the head and to a plane perpendicular thereto, whereby movement of the blades inwardly and outwardly of the respective blades acts to retract and to advance, respectively, the cutting edges of the blades with respect to the direction of rotation of the head; the provision of a tool of the type described in which the cutter blades are so adjustably positioned as to permit their ready re-sharpening and re-location of the cutting edges thereof on lines radial with respect to the axis of rotation of the head; and the provision of a tool of the type described so constructed and arranged as to permit radial shifting of the cutter blades in a quick and accurate manner when desired.

The above being among the objects of the present invention, the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views:

Fig. 1 is a fragmentary, partially broken plan view of a machine, including a cutter head constructed in accordance with the present invention, for forming curved serrations in an end face of a cylindrical piece of work;

Fig. 2 is a face view of the cutter head illustrated in Fig. 1, taken as looking on the line 2—2 of Fig. 1;

Fig. 3 is a fragmentary view similar to Fig. 2 but illustrating the manner in which the cutter blades are shifted in the head for the purpose of machining a piece of work to be mated with one which has been serrated previous to such shifting;

Fig. 4 is an end view of the piece of work shown mounted in the machine in Fig. 1, after it has been serrated; and, Fig. 5 is an enlarged fragmentary, sectional view taken on the line 5—5 of Fig. 4.

The present invention is applicable for use in the serrating of a surface of a part which is adapted to be arranged in abutting relation with respect to a complementarily serrated surface of another part adapted to be connected thereto. The interfitting curved serrations of the two faces in such case serve as a means for preventing relative displacement between the two parts in the plane of their mating faces except in the direction of the length of the serrations themselves. Broadly speaking, such serrated connections may be employed between any two members having abutting faces regardless of the character or construction of the members. However, one such use is in the connection between the various separately formed parts of a built-up crankshaft such as shown and claimed in United States Letters Patent No. 2,013,039, issued Sept. 3, 1935, to Julius Dusevoir. Where such serrated connections are to be employed between the various elements of a built-up machine part, such as the crankshaft disclosed in said United States Letters Patent above identified, it is essential in obtaining the desired final result that the serrations on opposed faces of such elements be accurately formed, and where one or more of the elements are to be interchangeable with other similarly formed elements it will be appreciated that a uniformity of size, contour and location of such serrations is necessary in order to obtain the desired result. The present invention provides a means by which such uniformity of result may be obtained in a desired state of accuracy and finish.

In the drawing, by way of illustration only, and as indicated in Figs. 1, 4 and 5, the piece of work there shown comprises a shaft section or other cylindrical piece of work 20 having a central bore 22 and an end face arranged in perpendicular relation with respect to its axis. As best brought out in Figs. 4 and 5 which shows such piece of work 20 with its end surface in finished serrated condition, such end face is provided with a multiplicity of parallel serrations 24 thereon, such serrations being of curved conformation struck from a center outside of the periphery of the piece of work and, of course, of uniform size throughout. While in the broader aspects of the invention the particular cross-sectional contour of the serrations 24 may vary considerably as long as such contour is such as to permit the serrations on a pair of members to be connected thereby to be readily interfitted by engagement of and disconnected from each other through separation of, the serrated faces, for the purpose of illustration the serrations 24, as best brought out in Fig. 5, are of triangular section having straight sides all disposed at equal angles with respect to the general plane of the surface on which they are formed.

In machining the serrations in accordance with the present invention, any suitable machine tool may be employed that is provided with a rotatable spindle and a support that may be moved relative to each other in the general direction of the axis of the spindle. An ordinary lathe is illustrative of this type of machine tool, is satisfactory for use in accordance with with present invention, and is assumed to be shown in Fig. 1. As indicated in that figure the lathe spindle is indicated at 30 and as being rotatably supported in a suitable or conventional spindle bearing 32. A V-block 34 is suitably mounted upon the bed of the lathe in parallelism with but eccentric to the axis of rotation of the spindle 30 for movement in a direction parallel to the axis of the spindle 30 toward and away from the same. The V-block may thus be mounted upon the usual carriage of the lathe or, as indicated in Fig. 1, it may be mounted upon a pair of ways such as 36 suitably fixed with respect to the bed of the lathe and controlled in its position axially of the spindle 30 by means of a hand wheel such as 38 and screw 40. The work 20 is received by the V-block 34 and, therefore, arranged with its axis parallel to the axis of the spindle 30, and may be clamped against movement in the V-block 34 in any suitable manner. The particular means shown for thus clamping the work 20 in the V-block 34 consists of a clamping bar 42 hinged at one end to one side of the V-block 34 by means of a pin such as 44, and is slotted as at 46 at its opposite end for reception of a bolt 48. The bolt 48 is pivoted at its lower end by means of a pin 50 to the V-block 34 so as to enable its opposite end to swing into and out of the slot 46. The bolt 48 carries a nut 52 at its upper end which when drawn down while the upper end of the bolt 48 is within the slot 46, causes the bar 42 to securely clamp the work 20 in the V-block 34. By loosening the nut 52 the upper end of the bolt 48 may be swung outwardly out of the notch 46 thus permitting the clamp 42 to be swung upwardly about the axis of the pin 44 and permitting the work 20 to be removed and replaced by new work.

In order to form the serrations in the end face of the work 20, a head indicated generally at 58 is mounted upon the end of the spindle 30 in a conventional manner. Such heads are conventionally known as "cat heads." In accordance with the present invention the head 58 carries one or more cutter blades 60 therein, three such cutter blades being shown in the drawing by way of illustration. Each cutter blade 60 is rectangular in section and of uniform thickness throughout except at the margin where the cutting edge is formed, the axially outer end face 64 thereof being serrated with the serrations lying in planes perpendicular to the front and rear faces of the blades 60 and in parallelism with the inner and outer edges thereof. The end face of each of the blades upon which the serrations 64 are formed is not disposed perpendicularly with respect to the front and rear faces of the blades 60 but is disposed at an angle with respect thereto to provide cutting clearance for the cutting edge of the blade as will hereinafter be more apparent.

As indicated in Figs. 1 and 2, the blades 60 are received in slots 66 formed in the head 58 and opening both on the front axial face of the head 58 and on the periphery thereof. The slots 66 are of such size as to relatively closely receive the corresponding cutter blades 66 therein, and when the blades 60 are completely bottomed in their corresponding slots 66 a relatively small portion of each blade projects outwardly beyond the axial end face of the head 58. Each slot 66 is furthermore so disposed that its more advanced wall, in the direction of rotation of the head, intersects the axial outer face of the head 58 on a line which is radially disposed with respect to the axis of rotation of the head 58. Additionally, the general plane of thickness of each slot 66 is arranged at an angle, as best brought out in Fig. 1, to a plane including the axis of rotation of the head 58 and the line of intersection of the advanced edge of the slot with the outer axial face of the head 58, such angle being shown in the drawing as approximately ten degrees but obviously may be either greater or lesser than this amount. The angularity of the slots 66 is such that in extending axially away from the front face of the head 58 they are inclined in a direction opposite to the normal direction of rotation of the head 58.

Under the conditions above described it will be appreciated that if the line of intersection between that wall of the slot more advanced in the direction of rotation of the head 58 intersects the axial end face of the head 58 on a radial line, the cutter blades 60 associated with such slots and bearing against such front wall of the slot in projecting outwardly beyond the outer face of the head 58 is so positioned that the edge of the serrated surface 64 more advanced in the direction of rotation of the head 58 is not radially disposed with respect to such axis. It is desired that such forward edge of the serrated surface 64 of each blade 60 forms the cutting edge of such blade and lies approximately on a line radial with respect to the axis of rotation of the head 58. In order to obtain this relation of the cutting edges of the blades 60, that portion of each blade 60 projecting forwardly, in the direction of rotation of the head 58, beyond the radial line mentioned is ground away to form a surface 68 which lies in a plane including the axis of rotation of the head 58 and is, therefore, radially disposed with respect to such axis, and thus establishes the cutting edges of the blades 60 in radial relation with respect to the axis of rotation of the head 58.

Each blade 60 is maintained against movement in its corresponding slot 66 in a radial direction with respect to the axis of rotation of the head 58 by means of a screw plug 69 threaded into the head 58 over the corresponding slot 66, as illustrated. The extent to which each cutter blade 60 is received axially in its corresponding slot 66 is controlled by means of a screw plug 70 threaded through the rear face of the head 58 centrally into the bottom of each of the slots 66 where its inner end serves as an abutment for the corresponding blades 60. The position of the screws 70, therefore, control the amount which each cutter blade 60 projects axially outwardly beyond the axial end face of the head 58. The angularity of the serrated end face 64 of each cutter blade 60 with respect to the plane of thickness of the cutter blade is such, as previously mentioned, as to provide ample cutting clearance for the cutting edge of the blade in operation. The serrations themselves are of such size and contour that, when viewed in a direction perpendicular to the face 68, they are complementary in whole or in part with the exact size, shape and contour of the serrations which it is desired to form in the work, in other words in the particular embodiment shown, with the serrations 24.

In practice all of the cutter blades 60 are adjusted so that their serrated cutting edges project exactly the same distance outwardly from the outer axial face of the head 58 and, of course, so that each serration of the cutting edge of each blade will lie in the same circle about the axis of rotation of the head 58 as the corresponding serrations on each of the remaining cutter blades 60. This last feature is preferably obtained by making the radial end walls of all of the slots 66 at exactly the same distance from the axis of rotation of the head 58 and machining all of the cutter blades 60 so that all of the serrations thereon bear exactly the same relation with respect to that end thereof which is to abut against such radial inner wall of the slot 66.

With the various cutter blades 60 located as above described and assuming that the V-block 34 is so located as to support the work at the desired distance from the axis of rotation of the head 58 to obtain the proper degree of curvature to the serrations 24 to be formed thereon, the head 58 is caused to be rotated and the work 20 is fed axially into engagement with the cutter blades 60, in the particular case shown by rotation of the wheel 38. The work is slowly fed into the rotating cutter blades and the serrated edges of the latter act to remove metal therefrom in exact accordance with the serrated edges of the blades, and the feeding movement of the work into the cutter blades is continued until the end surface of the work is provided with complete serrations thereon. The work is then backed off, the clamp 42 released and the completed work removed.

It will be appreciated by those skilled in the art that by positioning the cutting faces 66 of the various blades 60 radially of the axis of rotation of the head 58, and particularly by disposing the cutting edges of the various blades in radial relation with respect to the axis of rotation of the head 58, the shaping of the serrated edges 64 of the blades 60 to produce serrations of predetermined size and shape in the finished product is materially simplified as compared to any other arrangement. It will also be appreciated that the particular size and conformation of the serrations in the end surfaces 64 of the blades 60 having been determined for a radial position of the serrated cutting edges in the head 58, any variation of these cutting edges out of such radial relation would vary the size, shape and contour of the serrations in the work from that desired. Some means or method must be employed in the practical application of such tool so that in re-sharpening the blades the new cutting edges thus formed will be re-located in correct radial relation with respect to the axis of rotation of the head 58 if uniformity in the serrations of the finished work is to result.

The above is readily accomplished in accordance with the present invention in the following manner. When the cutters 60 need re-sharpening, the plugs 69 are loosened so as to relieve the clamping pressure on the various blades 60, and the screw plugs are then threaded inwardly from the back face of the head 58 and until each of the blades 60 has been projected an equal amount outwardly of its corresponding slot 66, upon which the plugs 69 are again tightened down to reclamp the blades 60 in the head 58. Because of the angular relationship of the general plane of thickness of the blades 60 with respect to the outer end face of the head 58 when the blades 60 are projected further out from their respective slots 66, the outer ends of the blades 60 will be advanced in the direction of normal rotation of the head 58 from the true radial position which they previously occupied. Thus the worn cutting edges of the blades, after such adjustment, will be angularly advanced out of the true radial relation with respect to the axis of rotation of the head 58 which they previously had assumed. Under such conditions the head 58 with the various blades 60 securely clamped therein is placed in a grinder and the forward face 66 of each blade is ground away until such forward face is again located in a radial plane including the axis of rotation of the head 58, thus effecting in one operation the sharpening of the blades and their re-location in the desired position of the blades with respect to the head.

It will be appreciated that if two cylindrical pieces of work, such as the workpiece 20 illustrated, or equivalent pieces of work, are supported in the same position in the machine shown and are serrated with the same positioning of the cutter blades 60, when the two pieces of work are positioned with their serrated faces in contact the serrations of both pieces cannot be arranged in interfitting relation with respect to each other. This is because the high points of the serrations on one of the pieces must fit within the low points of the serrations of the other of the pieces in order to effect a perfect interfitting relationship, requiring the high points of the serrations of one piece to correspond in curvature to the low points of the serrations of the other piece, whereas, under the conditions assumed, the high points of the serrations on both pieces are struck from equivalent centers. Accordingly, in order to have the serrations of one of the pieces accurately interfit with the serrations of the other of the pieces when such pieces are arranged in end-to-end relationship, it is necessary that the serrations of one piece be offset from the serrations of the other piece about a common center for all of the serrations by a distance equal to half of the pitch of, or distance between, the serrations.

In order to permit this desired arrangement of interfitting serrations to result by the use of the apparatus shown, after one of the pieces has been machined in accordance with the method above described and with the cutter blades 60 arranged as shown in Figs. 1 and 2, the blades 60 are loosened in their respective slots 66 by loosening the screw plugs 69, and a shim 74, illustrated in Fig. 3, is inserted between the radially inner end of each cutter blade 60 and the corresponding end of its slot 66, after which the cutter blades 60 are re-secured in position by tightening down the screw plugs 69. The shims 74 in such case are of a thickness such as to shift the cutter blades 60 outwardly of the respective slots 66 an amount to bring the high points of the serrations of the blades in alignment, radially of the head 58, with those points at which the low points of the serrations were formerly located during the preceding machining operation. Accordingly, when another piece is then machined with the cutter blades 60 re-adjusted as described and as indicated in Fig. 3, the serrations 24 which will be formed upon the corresponding piece of work, will be struck from a center corresponding exactly to the center from which the previous serrations were struck, but the serrations in this case will have their high points located radially from such center from the high points of the serrations formed on the previous member by a distance equal to half the distance between the serrations. Accordingly, in such case, when the two parts or pieces are placed in end-to-end relationship with the serrated faces abutting, the serrations of one of the pieces may be perfectly interfitted with the serrations of the other piece and the desired relation of parts thus obtained. With such arrangement of serrations on the two pieces, where the two pieces are cylindrical shafts or shaft sections, for instance, the two shafts may, as will be readily appreciated, be arranged in concentric relation with respect to each other and with the serrations of both pieces accurately interfitting one another so that, while the serrations of the two pieces are maintained in interfitting relationship, relative movement between the abutting faces of the two pieces in the plane of abutment is positively prohibited excepting only in the direction of length of the serrations.

Having thus described my invention what I claim by Letters Patent is:

1. In a tool of the type described, in combination, a rotatable supporting head having an axial end face, said head being provided with a plurality of slots of rectangular cross-sectional configuration therein extending in a general axial direction away from said end face and inclined therefrom in a direction opposite to the normal direction of rotation of said head, a cutter blade removably received in each of said slots and having one end thereof projecting axially beyond said axial end face, the outer ends of said cutter blades being serrated and that face of each said cutter blades at the projecting end thereof more advanced in the normal direction of rotation of said head being provided with a surface intersecting said serrated outer end thereof on a line substantially radial with respect to the axis of rotation of said head, all of said cutter blades projecting beyond said end face an equal amount and each serration on one of said blades being aligned circumferentially of the axis of rotation of said head with corresponding serrations on the remaining of said blades.

2. In a tool of the type described, in combination, a rotatable supporting head having an axial end face, said head being provided with a plurality of slots therein extending in a general axial direction away from said end face and inclined therefrom in a direction opposite to the normal direction of rotation of said head, an abutment screw threaded through the rear wall of said head and projecting into each of said slots, a cutter blade removably received in each of said slots in abutting relation with respect to said abutment screw therein and having one end thereof projecting axially beyond said axial end face, the outer ends of said cutter blades being serrated and that face of each said cutter blades at the projecting end thereof more advanced in the normal direction of rotation of said head being provided with a surface intersecting said serrated outer end thereof on a line substantially radial with respect to the axis of rotation of said head, all of said cutter blades projecting beyond said end face an equal amount and each serration on one of said blades being aligned circumferentially of the axis of rotation of said head with corresponding serrations on the remaining of said blades.

3. In a tool of the type described, in combination, a rotatable supporting head having an axial end face, said head being provided with a plurality of slots therein extending in a general axial direction away from said end face and opening upon both said end face and the periphery of said head, a cutter blade removably received in each said slots and having one end thereof projecting axially beyond said axial end face, a clamping plug bridging the radially outer end of each of said slots and threadable radially of said head bearing against each of said cutter blades for clamping said cutter blades against movement in their respective slots, the outer ends of said cutter blades being serrated and that face of each of said cutter blades at the projecting end thereof more advanced in the normal direction of rotation of said head being provided with a surface intersecting said serrated outer end thereof on a line substantially radial with respect to the axis of rotation of said head, all of said cutter blades projecting beyond said end face an equal amount, and each serration on one of said blades being aligned circumferentially of the axis of rotation of said head with the corresponding serrations on the remaining of said blades.

4. In a tool of the type described, in combination, a rotatable supporting head having an axial end face, said head being provided with a plurality of slots therein extending in a general axial direction away from said end face and inclined therefrom in a direction opposite to the normal direction of rotation of said head, an abutment screw threaded through the rear wall of said head and projecting into each of said slots, a cutter blade removably received in each of said slots in abutting relation with respect to said abutment screw therein and having one end thereof projecting axially beyond said axial end face, a clamping plug bridging the radially outer end of each of said slots and threadable radially of said head bearing against each of said cutter blades for clamping said cutter blades against movement in their respective slots, the outer ends of said cutter blades being serrated and that face of each said cutter blades at the projecting end thereof more advanced in the normal direction of rotation of said head being provided with a surface intersecting said serrated outer end thereof on a line substantially radial with respect to the axis of rotation of said head, all of said cutter blades projecting beyond said end face an equal amount and each serration on one of said blades being aligned circumferentially of the axis of rotation of said head with corresponding serrations on the remaining of said blades.

FRANK M. SMITH.